United States Patent Office 2,729,099
Patented Jan. 3, 1956

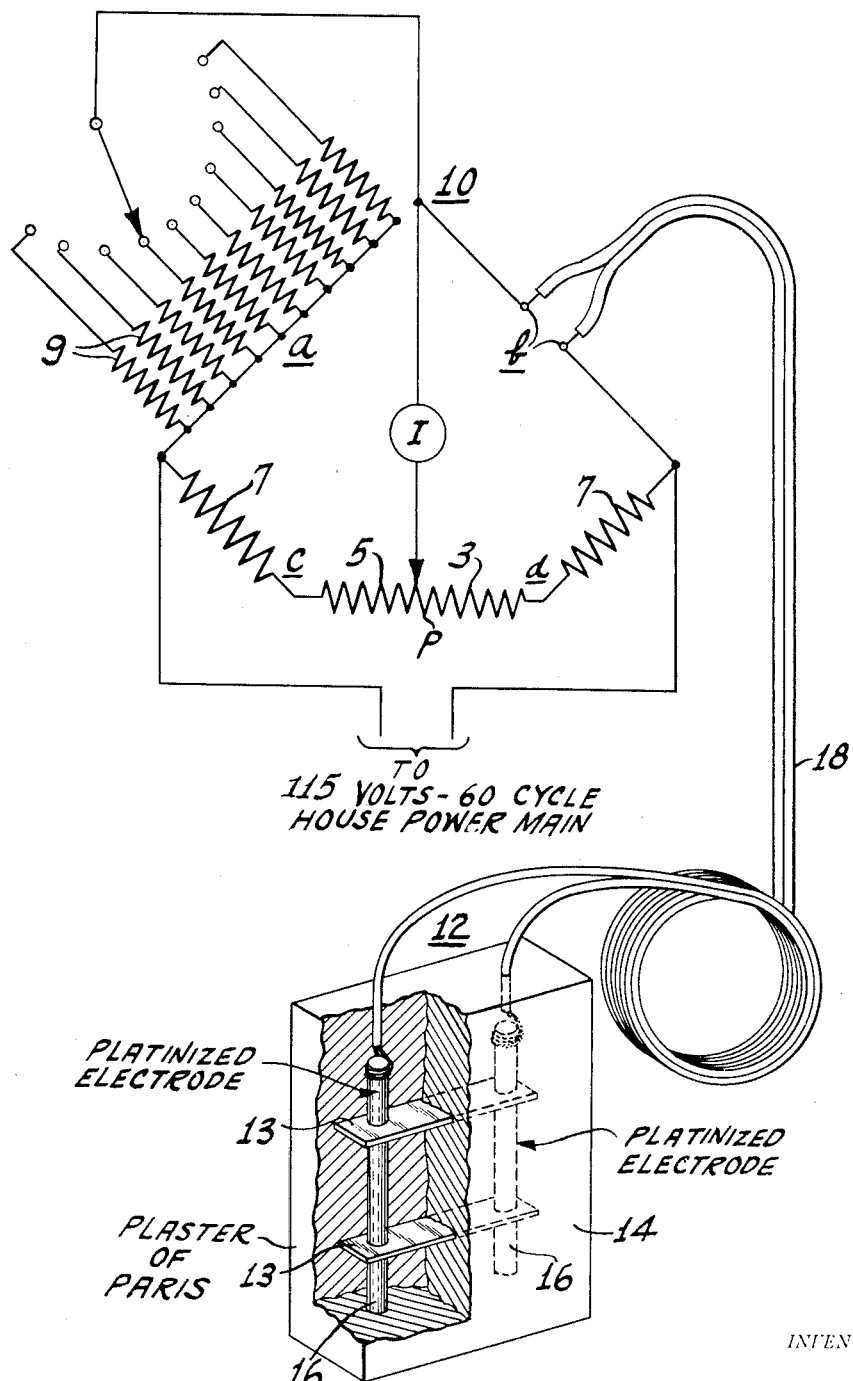

2,729,099

APPARATUS FOR MEASURING MOISTURE OF SOIL

Robert Rosenthal, Tenafly, N. J., assignor to Industrial Instruments, Inc., a corporation of New Jersey Application June 18, 1952, Serial No. 294,153

5 Claims. (Cl. 73—73)

This invention relates to the measurement of soil moisture and to the instruments and elements for performing this function. More particularly, the invention relates to an improved moisture-sensitive element in the form of a solid block of porous material adapted to be placed in the soil.

It is known to measure soil moisture by means of absorption blocks and a special adaptation of the Wheatstone bridge. In such known apparatus, the porous absorption block introduces an undesirable capacitance effect which must be balanced out or neutralized to obtain an accurate reading on the bridge. This balance or neutralization is achieved by introducing a variable condenser across one of the arms of the bridge. The accepted theory behind the need for the balancing condenser is that the condenser is necessary to eliminate the lead capacitance of the moisture absorption block. In order to obtain a measurement on the bridge with such apparatus, it is required to make two critical interdependent balancing adjustments; (1) a potentiometer adjustment and (2) a condenser adjustment. To reduce still further the effect of the so-called lead capacitance of the known type of moisture block, it has been customary to connect an oscillator or suitable source of alternating current or tone having a frequency in the range of 500 to 5000 cycles connected across one diagonal of the modified Wheatstone bridge, rather than a battery source of D. C. Such attempts to obtain great accuracy in measurements have resulted in increased cost and complexity of the measurement instrument and have not been found to be entirely satisfactory, particularly in sensitive instruments.

An explanation of why the capacity balance is required in prior instruments will now be given. If the electrodes of the block make direct contact with the gypsum which has varying moisture content depending upon the soil moisture content (assuming a complete absence of a gas film such as may be caused by polarization) the capacity between each electrode and the gypsum is infinite since the separation of the conductors constituting the gypsum as one plate and an electrode as another plate is zero. The formation of a gas film however, introduces a separation between the gypsum and the electrode which reduces this capacity. The equivalent circuit of a moist gypsum block is now considered as comprising the resistance which it is desired to measure in series with two capacitances each capacitance arising from the juxtaposition of an electrode and the surrounding gypsum. It is possible to provide an equivalent circuit for each series circuit of resistance and capacity by making a parallel combination of resistance and capacity in an adjacent arm of the Wheatstone bridge and this is what is effectively done in prior art Wheatstone bridge systems for soil moisture measurements with gypsum blocks in order to compensate or balance out the so-called capacitance effect which arises from polarization. As the bubbles or the polarization film gets larger the series capacitance decreases and this requires an increase in the value of the parallel balancing capacity in the adjacent arm of the bridge to obtain a sharp null.

Among the objects of the present invention are: to simplify the construction and operation of the bridge measuring instrument used in the measurement of soil moisture; to provide an improved moisture-sensitive porous absorption block which eliminates the so-called capacitance effect and hence the necessity for the balancing condenser in the measuring instrument to which the block is adapted to be connected; and to provide a moisture sensitive element in the form of a solid block of porous material having embedded therein spaced electrodes the surfaces of which are effectively grossly increased as by platinization.

A more detailed description of the invention follows in conjunction with a drawing whose single figure illustrates the improved moisture sensitive block of the invention in association with the simplified bridge-type instrument for the measurement of soil moisture.

Referring to the drawing, there is shown the improved electrical resistance method of measuring soil moisture by means of a simplified bridge 10 and an improved moisture sensitive porous block 12 adapted to be embedded in the soil. The block 12 of the invention comprises a solidified absorption material, such as plaster of Paris 14 in which are embedded a pair of spaced metallic electrodes 16. The electrodes 16 are aligned in holes in insulating spacers 13 shown in dotted lines. The moisture content of the plaster of Paris block varies with that of the soil, and its electrical resistance varies inversely as its moisture content. Hence the block resistance is an index of soil moisture. An important feature of the porous block of the invention is the construction of the electrodes 16. These electrodes comprise suitable nickel rods of highly electrically conductive metal whose surface area in contact with the plaster of Paris is platinized. This platinizing of the electrode surface area, known as platinum black, increases the effective surface area of the electrodes to an extent which compares to a physical increase in size of the electrodes 100 fold, although the actual thickness of each electrode is infinitesimally increased compared to the electrode without platinizing. This platinum black is actually a film which is deposited on the electrodes by an electroplating operation in a solution of approximately 3% platinum chloride.

An entirely unexpected and unpredictable result achieved by the platinum black coating on the embedded electrode surfaces of the moisture sensitive porous block of the invention is that it eliminates the so-called capacitance effect and enables the block to act as an almost pure resistance; stated in other words, the block has a very large capacity for the conduction of direct current.

The simplified modified Wheatstone bridge to whose terminals $b$ the improved moisture block 12 of the invention is connected by a pair of rubber covered leads 18, comprises four arms $a$, $b$, $c$ and $d$. Arm $a$ comprises a series of selectable resistors 9; arm $c$ comprises a fixed limiting resistor 7 and a portion 5 of a potentiometer P; and arm $d$ comprises a similar fixed limiting resistor 7 and a portion 3 of the potentiometer. The resistors 7 limit the range of adjustment of the bridge. Across one diagonal of the bridge is an indicator I which may be a magic eye tube, or earphones. Across the other diagonal is the source of alternating current, here shown as the house supply mains.

The aforementioned highly desirable and unpredictable effect of the moisture absorption block of the invention permits simplification in the construction and operation of the modified Wheatstone bridge measuring instrument to whose terminals *b* the block is connected, first by eliminating the need of a balancing condenser which is required and usually placed across the variable resistance arm *a* of known bridges, second by permitting the use of commonly available house main supply 110 volts —60 cycle rather than the high frequency signal hitherto required, and third by reducing the number of adjustments required to make an accurate measurement of the soil moisture. In prior soil measuring instruments, the polarization or previously called capacitance effect would be greatly accentuated if it were attempted to use ordinary house power supply, and the size of the balancing condenser would be greatly increased.

In one embodiment of soil moisture block of the invention constructed and satisfactorily tested, the absorbent material was a rectangular block of plaster of Paris 1.35" wide, .5 thick and 2.5" long having completely embedded therein platinized electrodes 2.15" long and .1" diameter spaced ¾" apart symmetrically relative to a longitudinal center line.

What is claimed is:

1. A soil moisture-sensitive element comprising a solid block of porous absorbent material having completely embedded therein a pair of spaced electrodes coated with black platinum, whereby the effective surface area of the electrodes is increased many times as compared to the surface area obtained from a mere increase in the peripheral dimensions of the electrodes.

2. A soil moisture-sensitive element comprising a solid rectangular block of porous absorbent material whose length is approximately twice as long as its width and approximately five times as long as its depth, and a pair of metallic electrodes coated with black platinum and completely embedded in said block for the major portion of its length and disposed symmetrically on opposite sides of the longitudinal center of said block, whereby the effective surface area of the electrodes is increased many times as compared to the surface area obtained from a mere increase in the peripheral dimensions of the electrodes.

3. A soil moisture-sensitive element in accordance with claim 2, wherein said electrodes are nickel rods coated with platinum black.

4. The combination with a moisture-sensitive element comprising a block of porous absorbent material having completely embedded therein a pair of spaced electrodes coated with black platinum, whereby the effective surface area of the electrodes is increased many times as compared to the surface area obtained from a mere increase in the peripheral dimensions of the electrodes, of a measuring instrument comprising a Wheatstone bridge completely devoid of concentrated capacitance, there being an indicator across one diagonal of said bridge and a connection across the other diagonal of said bridge for supplying house power supply thereto, said bridge having four arms in one of which is a series of selectable resistors, in two other arms a fixed resistor, there being a potentiometer between said last two arms, and in the fourth arm said block of porous absorbent material connected thereto by rubber-covered leads.

5. The combination with a moisture-sensitive element comprising a block of porous absorbent material having completely embedded therein a pair of spaced electrodes in the form of strands of wire coated with black platinum, whereby the effective surface area of the electrodes is increased many times as compared to the surface area obtained from a mere increase in the peripheral dimensions of the electrodes, of a measuring instrument comprising a Wheatstone bridge completely devoid of concentrated capacitance, there being an indicator across one diagonal of said bridge and a connection across the other diagonal of said bridge for supplying house power supply thereto, said bridge having four arms in one of which is a series of selectable resistors, in two other arms a fixed resistor, there being a potentiometer between said last two arms, and in the fourth arm said block of porous absorbent material connected thereto by rubber covered leads.

References Cited in the file of this patent

UNITED STATES PATENTS

| 2,367,561 | Bouyoucos | Jan. 16, 1945 |
| 2,501,377 | Cherry | Mar. 21, 1950 |
| 2,541,578 | Egalon et al. | Feb. 13, 1951 |
| 2,636,927 | Durham | Apr. 28, 1953 |
| 2,636,962 | Bouyoucos | Apr. 28, 1953 |

FOREIGN PATENTS

| 540,783 | France | Apr. 22, 1922 |